Nov. 27, 1928.

E. B. SHAND 1,693,407

VACUUM VALVE FOR RECTIFIERS

Filed Oct. 15, 1926

WITNESSES:
*C. J. Weller*
*O. B. Buchanan*

INVENTOR
*Errol B. Shand.*
BY
*Wesley G. Carr*
ATTORNEY

Patented Nov. 27, 1928.

1,693,407

UNITED STATES PATENT OFFICE.

ERROL B. SHAND, OF PITTSBURGH, PENNSYLVANIA, ASSIGNOR TO WESTINGHOUSE ELECTRIC & MANUFACTURING COMPANY, A CORPORATION OF PENNSYLVANIA.

VACUUM VALVE FOR RECTIFIERS.

Application filed October 15, 1926. Serial No. 141,783.

My invention relates to valves and it has particular relation to vacuum-tight valves adapted to connect an evacuated metal-tank mercury-arc rectifier to a pumping mechanism for maintaining the vacuum.

In particular, my invention relates to a valve mechanism in which the valve-head is carried by a flexible diaphragm whereby it may be moved to engage a valve-seat, the diaphragm being flexed by means of externally applied valve-gear, whereby the valve may be opened and closed without resorting to any rotating or sliding mechanism which must be passed through suitable glands in the walls of the evacuated vessel and which are a constant source of leakage and trouble.

My invention is illustrated in the accompanying drawing, wherein

Figure 1:
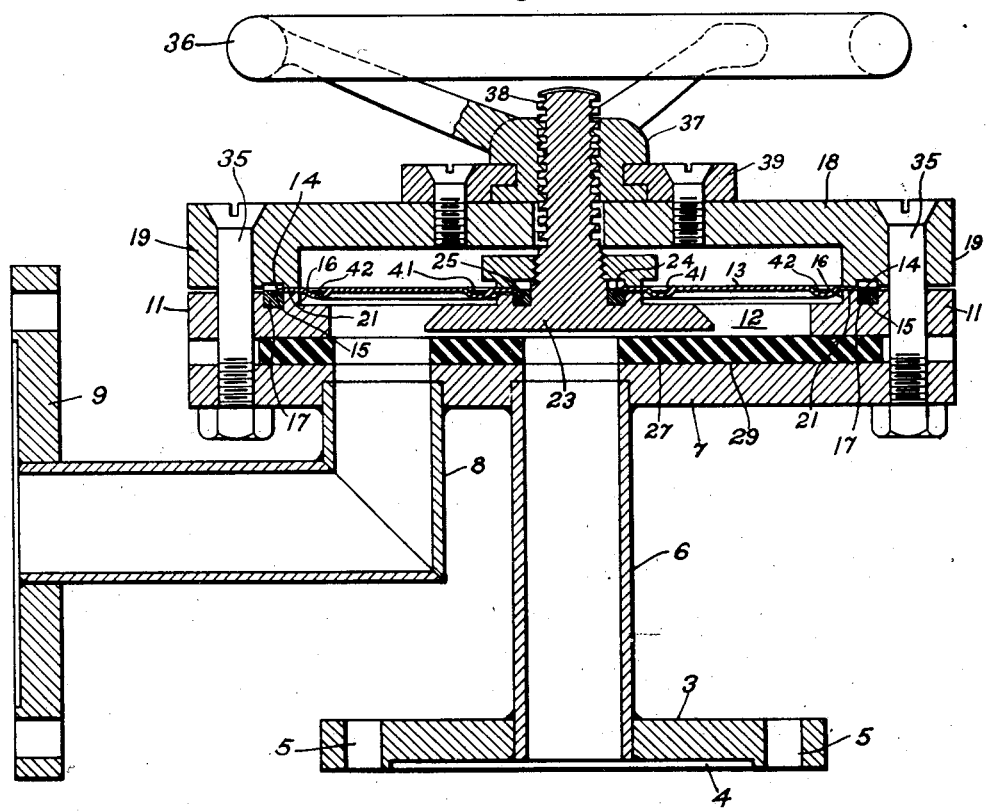
Figure 2:
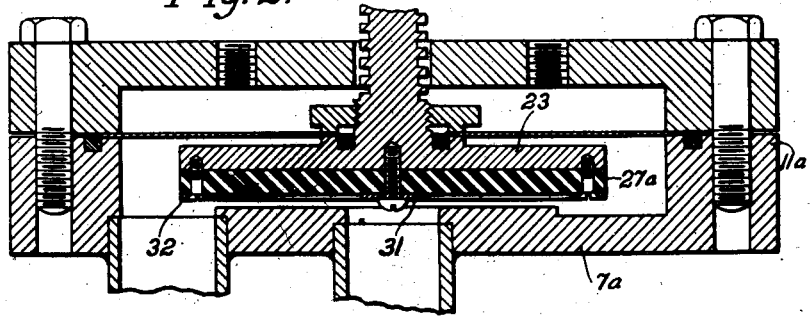

Fig. 1 is a longitudinal sectional view through a valve constituting the preferred embodiment of my invention and Fig. 2 is a fragmentary sectional view showing modifications in the structure.

As shown in Fig. 1, my valve comprises a base member 3 which is adapted to be connected to the top of a metal-case rectifier, either by welding or by a detachable connection utilizing a rubber gasket seated in a groove 4 in the bottom of the base plate, the entire assembly being tightly clamped to the metal case of the rectifier (not shown) by means of bolts extending through bolt holes 5. The base plate 3 is provided with a central opening within which is welded a vertical metal pipe 6 constituting a passageway communicating with a centrally disposed opening in a valve flange 7, the pipe being carefully welded to said flange to make a vacuum-tight joint, as are all of the other vacuum-tight joints between the metallic parts in my invention.

The valve flange 7 is provided with a non-centrally disposed opening which is in communication with a metal pipe or passageway 8 adapted to be connected to the pumping mechanism through any desired vacuum-tight pipe joint, as indicated at 9. The valve flange is provided with a raised peripheral flange 11 which is disposed around the outer periphery of the top surface of the valve flange to provide a chamber 12 communicating with the two passageways 6 and 8. The top of the chamber 12 is closed by a flexible diaphragm 13 which is preferably of steel, although it is possible that iron-coated copper or other metallic materials which are not attacked by mercury vapor or even rubber diaphragms might be utilized within the scope of my invention.

The outer periphery of the flexible diaphragm 13 is provided with a depending flange 14 which rests in an annular groove 15 which is provided in the top surface of the raised flange 11 at a point removed from the inner periphery 16 of the same. The depending edge 14 of the diaphragm is very carefully soldered in the annular groove 15 of the raised flange 11 in order to provide an absolutely vacuum-tight connection 17 between the two parts.

A valve cover-plate 18 has a depending peripheral flange 19 that is tightly bolted to the raised peripheral flange 11 of the horizontal valve flange 7, in such manner as to tightly clamp the diaphragm, at a point just within the depending outer edge 14 thereof, to the inner portion of the top of the raised flange 11, as indicated at 21, for the purpose of relieving the soldered joint 17 from mechanical strains due to the vacuum and to the flexing of the diaphragm.

The diaphragm 13 supports a centrally disposed valve-head 23, which, in the preferred embodiment of my invention shown in Fig. 1, is secured at a central opening 24 in the diaphragm by means of a soldered connection 25 similar to the soldered connection 17 just described. The valve-head 23 is constrained, by the diaphragm 13, to be moved in a direction which is normal to the top surface of the valve flange 7, the latter constituting a valve-seat surrounding the central port 6.

A yieldable washer 27 is provided between the valve-seat or flange 7 and the valve-head 23 to provide a vacuum-tight joint when the valve-head is forced downwardly toward said seat, thereby closing the central passageway which leads to the interior of the metal tank of the rectifier or other device (not shown) to which the valve may be attached. The most suitable material which I have found for the yieldable washer 27 is a good grade of soft rubber, although it is possible that other materials, such as lead or other soft metal, might be utilized. It is essential that, whatever material the yieldable washer is made of, it should be capable of being compressed and deformed so that it will enter into the most intimate contact with the surfaces of the valve-seat and the valve-head in order to make an effectual vacuum-tight joint when the valve is closed.

It is desirable that the rubber gasket 27 of the valve should be firmly united to either the valve-seat 7 or the valve-head 23 so that, when the valve is opened, the rubber gasket will pull away from the other part and will not stick to both parts in a manner which might cause the valve to remain sealed when an attempt is made to open the same. I have found that a most desirable way of securing the rubber gasket to one of the members is to utilize a cement of a nature which is capable of causing the rubber to adhere firmly to the iron surface of either the valve-seat or the valve-head. In Fig. 1, the rubber gasket is cemented at 29 to the valve flange 7 which constitutes the valve-seat. In Fig. 2, a rubber gasket 27a is permanently secured, by means of a metal washer 31 and a metal rim 32, to the under surface of the valve-head 23.

In order to facilitate the soldering and unsoldering operations which are necessary during the assembly and dis-assembly of the parts, and particularly to prevent the damaging effects of the strong heating which is necessary to loosen the solder in order to remove the diaphragm, and which would destroy the rubber washer and would injure the smooth surfaces with which the rubber washer is engaged, I prefer to make the raised flange 11, to which the outer periphery of the diaphragm is secured, as a separate annular rim which is detachable from the valve flange 7.

As shown in Fig. 1, the detachable connection just mentioned is provided by the same piece of rubber which constitutes the gasket 27 between the valve-head and the valve-seat, the rubber being cut in a circular piece covering all of the top surface of the valve flange 7 except the extreme outer periphery thereof, and being provided with two openings registering with the two openings in the valve flange 7 for communicating with the two passageways or metal tubes 6 and 8. The separate annular member which constitutes the raised flange 11 is secured in a vacuum-tight clamping engagement against the rubber member 27 by means of bolts 35 which extend through the cover plate 18, the annular raised flange member 11 and the outer edges of the valve flange 7, as shown in Fig. 1.

It is to be understood, however, that the detachable mounting of the raised flange 11, just described, while very desirable for the reasons already explained, is not absolutely essential, as has been indicated in the modified construction shown in Fig. 2, wherein the raised flange 11a is an integral portion of the valve plate 7a.

The valve-head 23 is raised and lowered by means of any suitable valve-gear, such as an operating wheel 36 which may be either a hand wheel or a motor-operated wheel, provided with a nut 37 which engages a threaded valve-stem 38 to raise and lower the valve-head. The nut engages the top of the cover plate 18 which is provided with a perforation loosely receiving the valve-stem 38. The nut 37 may be held against the top of the cover plate 18 by means of a split collar 39, as shown in Fig. 1.

The flexible metal diaphragm 13 is preferably provided with two annular corrugations 41 and 42 which are adjacent to the valve-head 23 and to the outer raised flange portion 11, respectively, for the purpose of increasing the flexibility of the diaphragm and preventing breakage thereof, in a manner which will be obvious.

While I have shown two embodiments of my invention, it is to be understood that the showings are illustrative only and that I am not limited to the precise details thereof, except as may be definitely recited in the appended claims.

I claim as my invention:

1. A substantially vacuum-tight valve comprising a metallic valve flange having a centrally disposed opening and a non-centrally disposed opening therein, metallic passageways communicating with said openings, respectively, a raised metallic flange disposed around the periphery of said flange, a flexible metallic diaphragm having its outer edge soldered to a point removed from the inner edge of the top surface of said raised flange for making a vacuum-tight joint therewith, a valve cover-plate having a downwardly depending peripheral flange clamped tightly against said diaphragm to hold the same against the inner portion of the top surface of said raised flange to relieve said soldered joint from mechanical strains due to the vacuum and the flexing of the diaphragm, a centrally disposed valve-head carried by said diaphragm, a lining of yieldable material interposed between said valve-head and said flange and attached to one of the same for making a substantially vacuum-tight joint when the valve is closed, and an external valve-gear for moving said valve-head.

2. A substantially vacuum-tight valve comprising a metallic valve flange having a centrally disposed opening and a non-centrally disposed opening therein, metallic passageways communicating with the under sides of said openings, respectively, a separate annular flange member secured, in a readily detachable vacuum-tight joint, to the top surface of said valve flange near the outer periphery thereof, a flexible metallic wall member having its outer edges secured, in a less readily detachable vacuum-tight joint, to said separate annular flange, whereby repairs are facilitated by the removal of said separate annular flange from said valve flange, a centrally disposed valve-head carried by said flexible metallic wall member, a lining of yieldable material interposed between said valve-head and said valve flange and attached to one of the same for making a substantially vacuum-tight joint when the valve is closed, and an external valve-gear for moving said valve-head.

3. In a metallic vacuum-tight valve, the combination including a valve flange having a centrally disposed opening and a non-centrally disposed opening, metallic passageways secured, in a permanent vacuum-tight manner, to the underside of said flange in communication with said openings, respectively, means for connecting one of said passageways to an evacuated vessel, means for connecting the other end of said pasageways to a pump, a separate, ring-shaped member secured, in a detachable vacuum-tight manner, to the top of said flange near the periphery thereof, a flexible metallic vacuum-tight diaphragm having its outer edges secured, in a vacuum-tight manner, to said ring-shaped member in spaced relation to said valve flange, a centrally-disposed valve seat depending from the under side of said diaphragm, a yieldable washer interposed between said valve seat and the adjacent portions of said valve flange surrounding said central opening, said washer being adapted to make a vacuum-tight joint when compressed between said valve-seat and said valve flange, and an external valve-gear for moving said valve-seat to compress said washer.

In testimony whereof, I have hereunto subscribed my name this 11th day of October, 1926.

ERROL B. SHAND.